United States Patent
Peng et al.

(10) Patent No.: US 11,402,325 B2
(45) Date of Patent: Aug. 2, 2022

(54) **METHOD FOR IDENTIFYING AUTHENTICITY AND ORIGIN OF *PANAX QUINQUEFOLIUS* BASED ON TERAHERTZ SPECTROSCOPY**

(71) Applicant: University of Shanghai for Science and Technology, Shanghai (CN)

(72) Inventors: Yan Peng, Shanghai (CN); Yiming Zhu, Shanghai (CN); Zefang Wang, Shanghai (CN); Songyan Hu, Shanghai (CN); Xu Wu, Shanghai (CN); Xitian Hu, Shanghai (CN); Can Sun, Shanghai (CN); Li Zhou, Shanghai (CN); Weinan Ge, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/321,410

(22) Filed: May 15, 2021

(65) Prior Publication Data
US 2021/0270734 A1  Sep. 2, 2021

(51) Int. Cl.
*G01N 21/3586* (2014.01)
*G01N 1/28* (2006.01)
*G01N 21/3563* (2014.01)
*G01N 21/35* (2014.01)

(52) U.S. Cl.
CPC ......... *G01N 21/3586* (2013.01); *G01N 1/286* (2013.01); *G01N 21/3563* (2013.01); *G01N 2021/3572* (2013.01); *G01N 2021/3595* (2013.01)

(58) Field of Classification Search
CPC .............. G01N 21/3586; G01N 1/286; G01N 21/3563; G01N 2021/3572; G01N 2021/3595
See application file for complete search history.

(56) References Cited

U.S. PATENT DOCUMENTS

2019/0323956 A1* 10/2019 Peng ................. G01N 21/3586

FOREIGN PATENT DOCUMENTS

| CN | 101685089 A | 3/2010 |
|---|---|---|
| CN | 102505045 A | 6/2012 |
| CN | 102621116 A | 8/2012 |

* cited by examiner

*Primary Examiner* — David P Porta
*Assistant Examiner* — Gisselle M Gutierrez

(57) ABSTRACT

Provided is a method for identifying authenticity and origin of *Panax quinquefolius* based on terahertz spectroscopy. The time domain spectral information of the *Panax quinquefolius* sample is obtained, and converted into the frequency domain spectral information by Fourier transform to calculate a terahertz absorption spectrum. The identification is performed by observing whether there are characteristic absorption peaks of pseudoginsenoside F11 in the terahertz absorption spectrum.

4 Claims, 2 Drawing Sheets

METHOD FOR IDENTIFYING AUTHENTICITY AND ORIGIN OF *PANAX QUINQUEFOLIUS* BASED ON TERAHERTZ SPECTROSCOPY

CROSS-REFERENCE TO RELATED APPLICATIONS

This application claims the benefit of priority from Chinese Patent Application No. 202110053175.9, filed on Jan. 15, 2021. The content of the aforementioned application, including any intervening amendments thereto, is incorporated herein by reference in its entirety.

TECHNICAL FIELD

This application relates to identification technology, and more particularly to a method for identifying authenticity and origin of *Panax quinquefolius* based on terahertz spectroscopy.

BACKGROUND

*Panax quinquefolium*, an ancient and precious herbaceous species in the family Araliaceae, is a valuable medicinal plant in many countries because of its antihypertensive, nerve cell stimulatory, antidiabetic, and anticancer properties. The medicinal value of *Panax quinquefolium* is similar to that of *Panax notoginseng*. *Panax quinquefolium* has diverse ginsenosides beneficial to humans, with extensive pharmacological effects on the central nervous system, cardiovascular system, endocrine system, and immune system. Moreover, these compounds are useful for treating cancer. Currently, the commercially-available *Panax quinquefolium* products exhibit great difference in the pharmacological effects due to their differences in species, origins, and production environments. Therefore, it is necessary to pre-detect the key components to classify and qualify the *Panax quinquefolium* before entering the market.

The existing identification methods for *Panax quinquefolium* mainly include appearance analysis, microscopic analysis and examination of physical and chemical properties.

The appearance analysis is the simplest, fastest and easiest approach to identify the authenticity, quality and origin of the medicinal materials by observing the shape, size, color, texture, odor, surface, fracture surface, and main identification characteristics in water test and fire test. However, this method is merely suitable for the identification of intact medicinal materials, and when the medicinal materials are processed into decoction pieces or powder and lose their necessary characteristics, this method is no longer applicable.

The microscopic identification is to analyze the tissue structure, cell morphology and inclusion of traditional Chinese medicines using microscopic techniques, which is suitable for the identification of intact medicinal materials that are difficult to identify by appearance, broken or powdered medicinal materials, and Chinese patent medicines, especially for the identification of powdered medicinal materials. Compared with physicochemical identification and molecular identification, the microscopic identification has advantages of simple equipment, less reagent consumption, and rapid identification. However, this method still suffers some limitations, for example, it is difficult to distinguish the medicinal materials pertaining to the same genus by microscopic identification due to the similar microscopic characteristics.

With regard to the physicochemical identification, characteristic chemical components of traditional Chinese medicines are qualitatively or quantitatively analyzed using physical methods, chemical methods or instrumental analysis methods. Currently, the physicochemical identification is mainly performed by spectroscopy, chromatography, coloration, fluorescence reaction, micro-sublimation, precipitation and spectrophotometry, which leads to a time-consuming operation.

In addition, with respect to the *Panax quinquefolium* tablets and powder free of their original morphological characteristics, it is not easy to distinguish them from powder of the congeneric medicinal materials or other powdered materials derived from rice, potatoes, wheat, millet or soybeans, and thus some counterfeit *Panax quinquefolium* products are produced and sold. The counterfeit medicine not only affects the efficacy and safety of *Panax quinquefolium* in clinical treatment and health care, but also disrupts the normal order of the Chinese herbal medicine market. Currently, there is no method for non-destructive analysis and origin identification of *Panax quinquefolius* and other Chinese herbal medicines.

SUMMARY

An object of this application is to provide a method for identifying authenticity and origin of *Panax quinquefolius* based on terahertz spectroscopy to overcome the problems in the existing identification techniques of *Panax quinquefolius*.

The technical solutions of this application are described as follows.

This application provides a method for identifying authenticity and origin of *Panax quinquefolius* based on terahertz spectroscopy, comprising:

(1) pulverizing a *Panax quinquefolius* sample by a pulverizer followed by mixing with a powder of a material with a terahertz transmittance in proportion to produce a powder mixture, and then compressing the powder mixture into a tablet by a tablet press;

(2) reducing a humidity in a sample chamber of a terahertz spectrometer to 3%, and collecting a time domain spectral information of a tablet of the material with terahertz transmittance as thick as the tablet obtained in step (1) as a background;

(3) placing the tablet obtained in step (1) on a sample holder followed by analysis to obtain a time domain spectral information of the tablet obtained in step (1), and converting the time domain spectral information of the tablet obtained in step (1) into frequency domain spectral information by Fourier transform to calculate a terahertz absorption spectrum;

(4) observing whether there are absorption peaks at 1.76 THz, 3.11 THz, and 3.61 THz specific to *Panax quinquefolius* in the terahertz absorption spectrum; wherein if there are absorption peaks at 1.76 THz, 3.11 THz, and 3.61 THz, the *Panax quinquefolius* sample is determined to be true *Panax quinquefolius*; and (5) observing whether there is an absorption peak at 2.53 THz in the terahertz absorption spectrum after confirming that the *Panax quinquefolius* sample is true *Panax quinquefolius*; and determining that an origin of the *Panax quin-*

*quefolius* is China if there is an absorption peak at 2.53 THz, otherwise determining that the origin of the *Panax quinquefolius* is North America.

In some embodiments, the absorption peaks at 1.76 THz, 3.11 THz, and 3.61 THz are characteristic peaks of pseudoginsenoside F 11 in *Panax quinquefolius*.

In some embodiments, in steps (1) and (2), the material with terahertz transmittance is polyethylene.

In some embodiments, in step (1), the *Panax quinquefolius* sample is in a form of original material, powder, preparation, liquid or lozenge.

Compared to the prior art, this application has the following beneficial effects.

The method provided herein for identifying authenticity and origin of *Panax quinquefolius* using terahertz spectroscopy has a simple and convenient operation process. Moreover, the entire process is usually completed within a few minutes, which is far shorter than the traditional test cycle (at least a few days to a few weeks), thus improving the identification efficiency. This application solves the problem in the prior art that it cannot rapidly and quantitatively identify the authenticity and origin of *Panax quinquefolius*. In addition, the method only requires a small amount of sample for detecting, which will not cause damage to the raw material.

DETAILED DESCRIPTION OF EMBODIMENTS

The present disclosure will be described in detail below with reference to the drawings and embodiments. The detailed implementation of the technical solutions of the present disclosure is described in the following embodiments. It should be understood that these embodiments are merely illustrative of the present disclosure, and are not intended to limit the scope of the present disclosure.

This application provides a method for identifying authenticity and origin of *Panax quinquefolius* based on terahertz spectroscopy, which can quickly, cost-effectively and easily identify the origin of the *Panax quinquefolius* and determine a content of key ingredients of the commercially-available *Panax quinquefolius* drugs.

The method has the following steps.

1. A *Panax quinquefolius* sample is pulverized by a pulverizer and mixed with a powder of a material with a high terahertz transmittance in proportion, and then the mixture is compressed into a tablet by a tablet press, where the material with a high terahertz transmittance can be polyethylene, cycloolefin polymer or other materials with high terahertz transmittance.

2. Humidity in a sample chamber of a terahertz spectrometer is reduced to 3% or less to measure a background in a single channel, and a time domain spectral information of a polyethylene tablet as thick as the tablet of the mixed powder is collected as the background.

3. The tablet obtained in step (1) is placed on a sample holder followed by analysis to obtain a time domain spectral information of the tablet obtained in step (1), and the time domain spectral information of the tablet obtained in step (1) is converted into frequency domain spectral information by Fourier transform to calculate a terahertz absorption spectrum. The calculation formula is Ab=−log(Sam/Ref); where Ab is an absorption data, Sam is a frequency domain spectral data, and Ref is a reference frequency domain spectral data.

Figure 1:
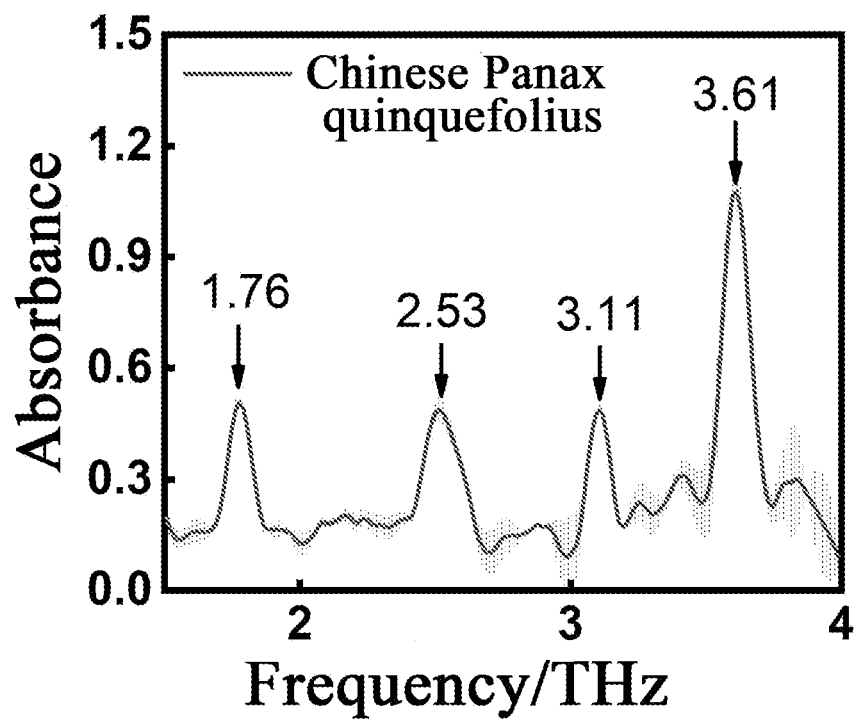
FIG. 1 is a characteristic spectrum of Chinese *Panax quinquefolius* obtained by a method according to an embodiment of the present disclosure.

4. The absorption spectrum data of the *Panax quinquefolius* sample is analyzed, and whether there are absorption peaks at 1.76 THz, 3.11 THz, and 3.61 THz specific to *Panax quinquefolius* in the terahertz absorption spectrum is observed to judge the authenticity of the *Panax quinquefolius* contained in the sample. The characteristic spectrum of the Chinese *Panax quinquefolius* is shown in FIG. 1, there are absorption peaks at 1.76 THz, 3.11 THz, and 3.61 THz, the *Panax quinquefolius* sample is determined to be true *Panax quinquefolius*.

Figure 2:
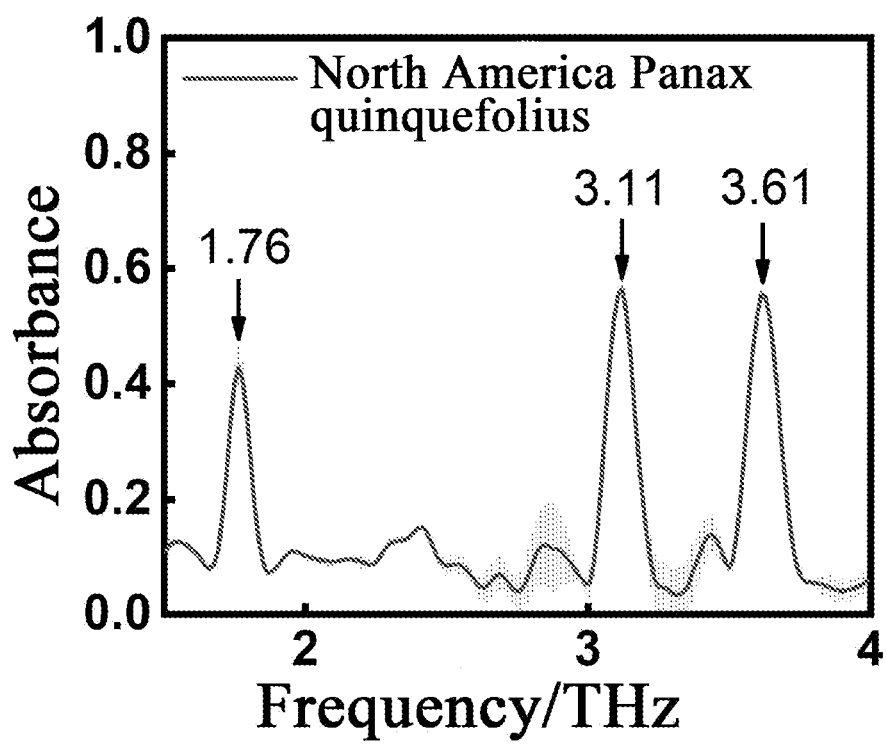
FIG. 2 is a characteristic spectrum of North America *Panax quinquefolius* obtained by the method according to an embodiment of the present disclosure.

5. After the sample is confirmed to be a ture *Panax quinquefolius*, whether there is an absorption peak at 2.53 THz in the terahertz absorption spectrum is observed to determine the origin of the *Panax quinquefolius*. Comparing FIG. 1 and FIG. 2, the difference between the two kinds of *Panax quinquefolius* is the absorption peak at 2.53 THz. The origin of the *Panax quinquefolius* is determined to China if there is an absorption peak at 2.53 THz, otherwise the origin of the *Panax quinquefolius* is determined to North America.

EXAMPLE 1

Instruments: terahertz spectrospectrometer, electronic scale, pulverizer, tablet press and grinding dish.

Samples: Chinese *Panax quinquefolius* samples, North America *Panax quinquefolius* samples and polyethylene powder (PE);

The preparation of a test sample was described as follows.

The *Panax quinquefolius* sample was pulverized by the pulverizer to obtain a sample powder. An appropriate amount of the sample powder was weighed using an electronic scale and mixed with polyethylene powder in a grinding dish, where a mass ratio of the sample powder to the polyethylene powder was 6:1. Then, the powder mixture was compressed into a sample tablet in a tablet press with a force of 3 tons for 3 min, which was then analyzed by the terahertz spectrometer.

(1) Humidity in the sample chamber of the terahertz spectrometer was reduced to 3% or less to measure a background in a single channel, and a time domain spectral information of a polyethylene tablet as thick as the tablet of the mixed powder was collected as the background.

(2) The sample tablet was placed on the sample holder followed by analysis to obtain a time domain spectral information of the sample tablet, and the time domain spectral information of the sample tablet was converted into frequency domain spectral information by Fourier transform to calculate a terahertz absorption spectrum.

$$Ab = -\log\left(\frac{Sam}{Ref}\right);$$

The calculation formula was where Ab was absorption data, Sam was frequency domain spectral data, and Ref was reference frequency domain spectral data.

(3) The absorption spectrum data of the *Panax quinquefolius* sample was analyzed, and whether there are absorption peaks at 1.76 THz, 3.11 THz, and 3.61 THz specific to

*Panax quinquefolius* in the terahertz absorption spectrum was observed to judge the authenticity of the *Panax quinquefolius* contained in the sample. Whether there is an absorption peak at 2.53 THz in the terahertz absorption was observed after confirming that the *Panax quinquefolius* sample is true *Panax quinquefolius*. An origin of the *Panax quinquefolius* is determined to China if there is an absorption peak at 2.53 THz, otherwise the origin of the *Panax quinquefolius* is determined to North America.

The *Panax quinquefolius* sample can be in a form of original material, powder, preparation, liquid or lozenge.

Figure 3:
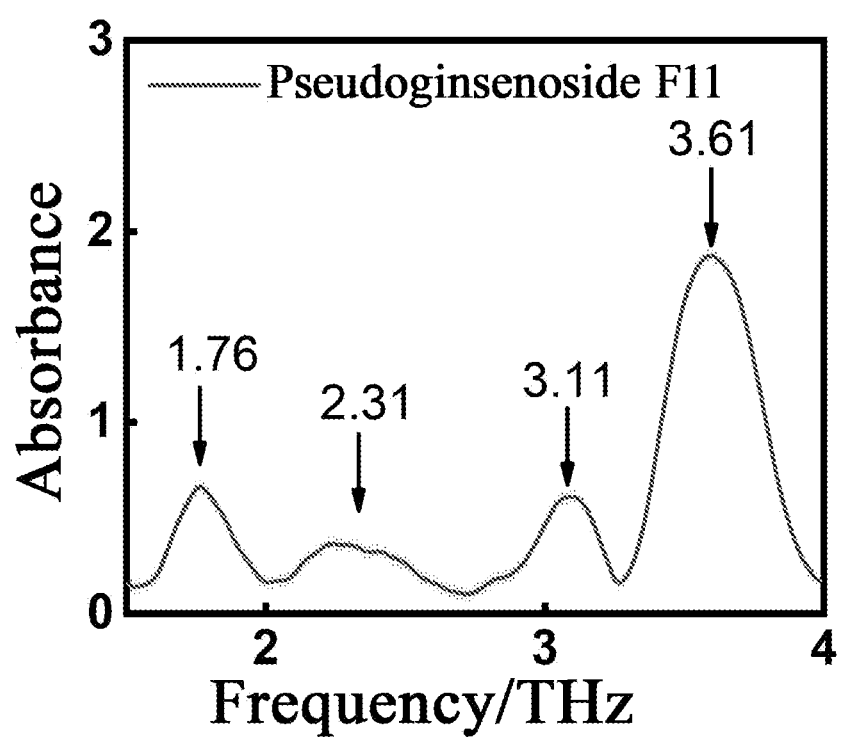
FIG. 3 is a characteristic spectrum of pseudoginsenoside F11.

Pseudoginsenoside F11 was a saponin specific to *Panax quinquefolius*, and its characteristic spectrum was shown in FIG. 3. In the method of the disclosure, the identification of *Panax quinquefolius* is performed by observing whether there were three characteristic peaks (1.76 THz, 3.11 THz and 3.61 THz) of the pseudoginsenoside F11 in the terahertz absorption spectrum of the sample. The conventional *Panax quinquefolius* identification did not involve the terahertz absorption peaks of pseudoginsenoside F11. In addition, the absorption peak at 2.53 THz is specific to Chinese *Panax quinquefolius*. Other terahertz analysis methods of medicines did not propose the use of three characteristic peaks (1.76 THz, 3.11 THz, 3.61 THz) of pseudoginsenoside F11 for identification of *Panax quinquefolius* and the characteristic peak at 2.53 THz for the identification of origin, failing to enable effective detection of *Panax quinquefolius*.

What is claimed is:

1. A method for identifying authenticity and origin of *Panax quinquefolius* based on terahertz spectroscopy, comprising:
   (1) pulverizing a *Panax quinquefolius* sample by a pulverizer followed by mixing it with a powder of a material with a terahertz transmittance in proportion to produce a powder mixture, and then compressing the powder mixture into a tablet by a tablet press;
   (2) reducing a humidity in a sample chamber of a terahertz spectrometer to 3%, and collecting a time domain spectral information of a tablet of the material with terahertz transmittance as thick as the tablet obtained in step (1) as a background;
   (3) placing the tablet obtained in step (1) on the a sample holder followed by analysis to obtain a time domain spectral information of the tablet obtained in step (1), and converting the time domain spectral information of the tablet obtained in step (1) into frequency domain spectral information by Fourier transform to calculate a terahertz absorption spectrum;
   (4) observing whether there are absorption peaks at 1.76 THz, 3.11 THz, and 3.61 THz specific to *Panax quinquefolius* in the terahertz absorption spectrum; and wherein if there are absorption peaks at 1.76 THz, 3.11 THz and 3.61 THz, the *Panax quinquefolius* sample is determined to be true *Panax quinquefolius* ; and
   (5) observing whether there is an absorption peak at 2.53 THz in the terahertz absorption spectrum after confirming that the *Panax quinquefolius* sample is ture *Panax quinquefolius*; and determining that an origin of the *Panax quinquefolius* is China if there is an absorption peak at 2.53 THz, otherwise determining that the origin of the *Panax quinquefolius* is North America.

2. The method of claim 1, wherein the absorption peaks at 1.76 THz, 3.11 THz, and 3.61 THz are characteristic peaks of pseudoginsenoside F11 in *Panax quinquefolius*.

3. The method of claim 1, wherein in steps (1) and (2), the material with terahertz transmittance is polyethylene.

4. The method of claim 1, wherein in step (1), the *Panax quinquefolius* sample is in a form of original material, powder, preparation, liquid or lozenge.

* * * * *